United States Patent [19]

Weigandt et al.

[11] Patent Number: 5,496,579
[45] Date of Patent: Mar. 5, 1996

[54] PROCESS AND APPARATUS FOR PRODUCING A FLAVORING COMPOSITION

[75] Inventors: C. Steve Weigandt, Cordova, Tenn.; Jerry J. Carter, Plano, Tex.; Anthony V. DiMaiolo, Germantown, Tenn.

[73] Assignee: Kraft Foods, Inc., Northfield, Ill.

[21] Appl. No.: 409,654

[22] Filed: Mar. 24, 1995

[51] Int. Cl.$^6$ .................................................. A23L 1/232
[52] U.S. Cl. ........................... 426/533; 426/417; 426/487; 426/494; 426/650; 99/470; 99/496; 202/182
[58] Field of Search ..................................... 426/533, 417, 426/650, 487, 492, 494; 202/182, 202, 236, 186; 203/87, 31, 50; 99/470, 496, 495

[56] References Cited

U.S. PATENT DOCUMENTS

| | | | |
|---|---|---|---|
| 4,571,342 | 2/1986 | DiCicca et al. | 426/533 |
| 4,604,290 | 8/1986 | Lee et al. | 426/533 |
| 4,820,538 | 4/1989 | Schulman et al. | 426/533 |
| 4,865,868 | 9/1989 | Kuss | 426/613 |
| 5,073,398 | 12/1991 | Kuss | 426/613 |
| 5,158,795 | 10/1992 | Chen et al. | 426/312 |
| 5,178,892 | 1/1993 | Simmons et al. | 426/533 |

FOREIGN PATENT DOCUMENTS

0463660B1  9/1993  European Pat. Off..

*Primary Examiner*—Donald E. Czaja
*Assistant Examiner*—Lien Tran
*Attorney, Agent, or Firm*—Bacon & Thomas

[57] ABSTRACT

A process and apparatus for producing flavoring compositions by subjecting a thin film of fat or oil to an elevated temperature of about 600° F. in the presence of oxygen. The elevated temperature causes the oil or fat to undergo a phase change to produce an exothermic gaseous material. The gaseous material is cooled rapidly to produce a liquid phase and a vapor containing an aerosol. The liquid phase is collected as a first flavorant and the vapor phase passed through a condenser to recover the aerosol as a flavorant with a more intense grill flavor. The remaining smoke or vapor is exhausted from the apparatus to remove the tarry and acrid flavor notes.

8 Claims, 1 Drawing Sheet

PROCESS AND APPARATUS FOR PRODUCING A FLAVORING COMPOSITION

FIELD OF THE INVENTION

This invention relates to a process and apparatus for producing a grill flavor and more particularly to a process and apparatus for subjecting a thin film of a fat or oil to an elevated temperature in the presence of oxygen.

BACKGROUND FOR THE INVENTION

A demand for grilled meat flavor led to the development of a process for producing such flavors as disclosed in U.S. Pat. No. 4,571,342 of DiCicca et al. That process which has enjoyed considerable commercial success involves subjecting a thin film of fat or oil to temperatures within the range of about 300° F. to about 855° F. in the presence of oxygen. The thin film of oil or fat is subjected to the elevated temperature for a period of time which is effective to develop a charcoal or charred meaty flavor and the fat or oil is collected to prepare a flavoring composition.

A more recent development of Schulman et al., U.S. Pat. No. 4,820,538 produces a charcoal broiled flavor by subjecting a thin film of fat or oil to a temperature of at least 600° F. for a period of time less than 2 minutes to exothermically heat the fat or oil to at least 650° F. The heated fat or oil is then rapidly cooled to less than 220° F. and a minor fraction of the exothermically heated oil is spent as waste vapor. In this approach, there is a 10–20% dissipation of the smoky constituents which contain tarry and acrid notes.

It is now believed that there is a continuing demand for an improved process and apparatus wherein trapped aerosols can be used to provide an intense grill flavor. It is also believed that there is a significant demand for such a process and apparatus wherein more intensive flavors are produced at a competitive cost and in a competitively priced apparatus.

SUMMARY OF THE INVENTION

The present invention contemplates an improved process and apparatus for producing a charcoal broiled meat flavor with an intense grill flavor. The process includes the steps of subjecting a thin film of fat or oil to an elevated temperature of at least about 600° F. in the presence of oxygen. This step may be carried out in a thin film heat exchanger for a period of time which is sufficient to cause the oil or fat to undergo a phase change to produce an exothermic gaseous material having a temperature of at least about 650° F. The process also includes the step of cooling the gaseous material to produce an oil phase and a vapor phase containing an aerosol which is dispersed in a hot gas. The oil phase and vapor phase are separated with the oil phase being collected as a first flavor composition. The aerosols are then trapped or collected from the vapor phase and form an intense grill flavor which may or may not be added to the previously mentioned liquid flavor composition. And finally, the gas or smoke which contains tarry and acrid notes is exhausted from the system.

The apparatus in accordance with the present invention includes a thin film heat exchanger and a high speed swept surface agitator for subjecting a thin film of fat or oil to an elevated temperature of at least about 600° F. in the presence of air or oxygen. This causes the fat or oil to undergo a phase change to produce an exothermic gaseous material which includes an aerosol. A heat exchanger rapidly cools the gaseous material to produce an oil phase and a gas vapor phase which contains an aerosol. Means are also provided for subjecting the aerosols to a higher air flow to heat ratio such as about 3:1, which is relatively high with respect to an average air flow to heat ratio in the heat exchangers of about 1.25:1. In addition, means are provided for separating the oil phase from the gas vapor phase and for recovering the oil phase as a first flavor composition. The apparatus also includes an aerosol vapor collector for trapping and collecting the aerosols from the gas vapor stage as a second flavor composition. An exhaust vacuum or the like and a burner or catalytic reactor are provided for exhausting the gas and unwanted vapor which includes the tarry and acrid flavor notes from the system.

It is presently believed that the process and apparatus in accordance with the present invention offers a number of advantages over the prior art processes and apparatus. For example, the present process and apparatus provides an increased yield and at the same time provides a flavor composition with a more intense grill flavor. Such flavors can be recovered at a minimal additional cost. In addition, the apparatus can be fabricated at a competitive price, is of relatively simple design and relatively easy to service and maintain.

The invention will now be described in connection with the accompanying drawings.

DETAILED DESCRIPTION OF THE INVENTION

Figure 1:
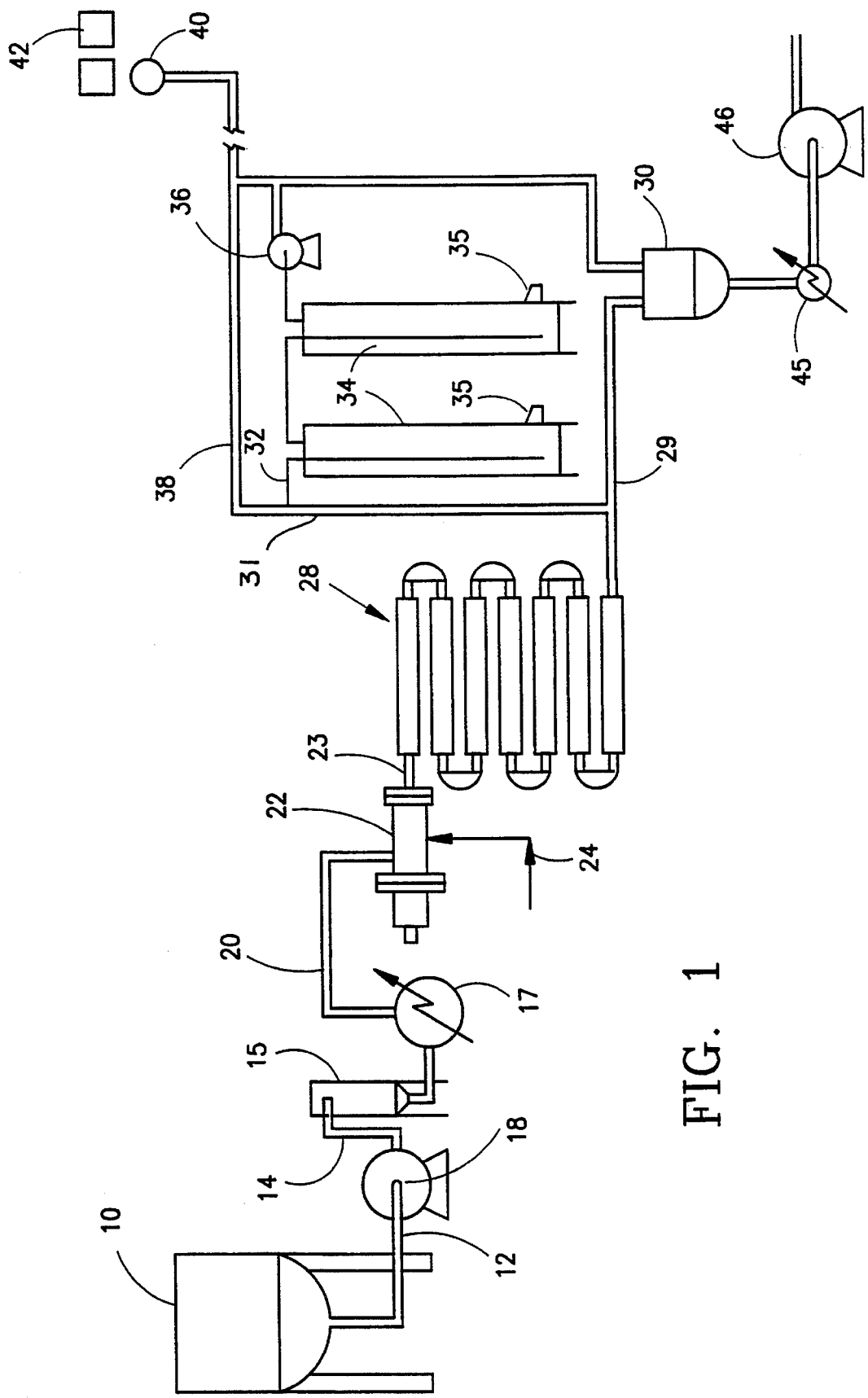
FIG. 1 is a schematic diagram which illustrates the process and apparatus for producing the charcoal broiled flavor in accordance with the present invention.

The invention will now be described by reference to the accompanying drawing wherein FIG. 1 illustrates the general layout for the apparatus and process for producing and collecting charcoal broiled and intense grill flavors. In essence, the invention constitutes and improvement over the earlier processes and apparatus which are described in the previously mentioned DiCicca et al. U.S. Pat. No. 4,571,342, and Schulman et al. U.S. Pat. No. 4,820,528, both of which are incorporated herein in their entirety by reference.

In a preferred embodiment of the invention, a hydrogenated vegetable oil, which may include: soy bean oil, corn oil, cotton seed oil, palm, palm kernal, coconut, sunflower, safflower, or a blend thereof, such as a hydrogenated is heated in an open kettle 10 to a temperature of at least about 160° F. The vegetable oil, which may be processed as: refined, bleached, and deodorized or refined, bleached, hydrogenated, and deodorized, may be replaced by a refined, bleached or decolorized oil or a tallow such as beef, kosher beef, chicken, lard, turkey or other flavored fats and oils. However, in using tallow, it is heated until it becomes liquid. The liquid fat or oil then passes through lines 12 and 14 by means of a positive displacement feed pump 18. The liquid fat or oil is pumped through a filter 15 which removes undesirable materials and is heated by heating element 17 to a temperature of about 200° F. From the heating element 17, the liquid fat or oil passes through line 20 and into a reactor 22.

In essence, the reactor 22 or rototherm is a standard thin film processor such as an Artison Rototherm E which is manufactured by Artison Industries, Inc. of Manatowoc, Wis. and described in their bulletin #4027-I. The processor incorporates a one square foot heat centrifically wiped exchanger wherein the one square foot refers to the heating surface. It should be noted that the reactor 22 or rototherm is modified by closing off the vapor vent that would normally remove the vapors. In addition, the heat exchange medium is replaced by an electric resistance heater.

Air is fed by line 24 to the reactor 22. The air is compressed and filtered in a conventional manner. The reactor 22 is maintained under a positive pressure of about 15-20 pounds per square inch gauge.

The heated fluid in the rototherm is distributed as a thin film having a thickness of no greater than 1/16", and preferably between 1/64" and 1/16". The fat phase will transfer to an exothermic gaseous phase. Considered in combination, these phases (liquid and gaseous fat or oil) will be treated for a period not exceeding 2 minutes, normally in the neighborhood of 90 seconds or less. During this retention time, the fat phase will be elevated in temperature by the heat exchanger in the presence of air, the fat being charged in such manner that the initial liquid phase exists a very minor percentage of the total time in the rototherm, typically less than 20 seconds. Under ideal conditions, the hot film will be rapidly vaporized, vaporization commencing at above 600° F.

The treated oil or fat product which leaves the reactor 22 passes through a pipe 23 and into a conventional heat exchanger 28. This heat exchanger 28 which is typically water cooled, cools the product to a temperature of between about 210° F. to about 230° F. in about 75 seconds. Up to this point, the process and apparatus are essentially identical to the previously mentioned Schulman et al. process. At this point, a portion of the process has been essentially terminated and the flavoring which will be referred to as a regular grill flavor resides in a liquid portion of the product. That portion, i.e., the liquid flavoring, passes through line 29 to a liquid vapor separator 30.

A second portion of the product, i.e., a gas vapor phase containing an aerosol is fed to an aerosol collector 34 by pipe 31 and line 32. This portion typically 5-15% by weight of the reacted constituents are subjected to a higher air flow to heat ratio due to vapor containment and because of the proper selection of parameters. For example, air flow, temperature and diameter of the various lines are such that the air flow to heat ratio are considerably higher than the air flow to heat ratio in the earlier part of the system, as for example, as the product passes through the heat exchanger 28.

For example, the air flow to heat ratio as the product passes through the heat exchanger 28 is about 1.25:1, while the air flow to heat ratio as the product passes through line 31 is in the range of about 2.5:1 to 3:1.

It is also desirable to combine small droplet and higher air flow to heat ratio in the latter portion of the cycle, i.e., after the product leaves the heat exchanger 28 in order to produce a product which exhibits a more intense flavor profile. The small droplet size is generated by the high speed swept surface agitator in the reactor 22. For example, the small droplet size is preferably in the range of 0.03 to 1.0 microns.

The aerosol collector 34 which is where the intense grill flavor is produced may comprise a pair of conventional condensers and a vacuum pump 36 which draws vapors from pipe 31 through line 32 and collectors 34 wherein the aerosols are removed from the gas flow. A minor portion about 3% by weight of the reacted constituents pass through line 38 to an exhaust vacuum blower 40. This air smoke mixture containing harsh tarry and acrid notes are mingled with an air smoke mixture from vapor separator 30 and drawn through a continuation of line 38 by the exhaust vacuum blower 40 and then to a thermal incinerator 42.

The cool temperature of from about 210°-230° F. is important since it determines the percentage yield of both flavor constituents. For example, the higher the cooling temperature as the material leaves the heat exchanger 28, the greater amount of spent vapor which will pass through line 31 to the aerosol collector 30, and a lower amount of liquid will pass through line 29 to a vapor separator 30. As illustrated schematically, the more intense grill flavors are collected from the base of the aerosol collectors 34, as for example, by valves 35.

The liquid phase material which passes from line 29 to the vapor separator 30 then passes through a heat exchanger 45 and a pump 46 to holding tanks which are not shown. In addition, a line 37 takes a small portion of vapor which may be carried along with the liquid flavorant from the vapor separator 30 to the exhaust vacuum blower 40.

Both flavorants, i.e., the liquid flavorant leaving vapor separator 30 and the more intense grill flavorant from valves 35 are filtered in a liquid state to remove any carbonaceous particles in a conventional manner, as for example, is described in the aforementioned Schulman et al. patent.

In the present process and in the use of the present apparatus, it is important to control the heat temperatures during the processing. The control of the reaction and particularly the heat temperature results in a more uniform end product and avoids the formation of off flavor notes. The process also involves cooling in a relatively rapid fashion, and the loss of a minor weight percentage of the vapors as at line 38 to eliminate undesirable flavor notes.

The intense grill flavors are obtained in a process having the following characteristics.

| NATURAL GRILL FLAVORS | | |
|---|---|---|
| | | Preferred Optimal |
| Property | Target | Range |
| Finished Product Flow Rate (lbs./hr.) | 100 | 95-100 |
| Air Flow Rate (cubit ft./hr.) | 480 | 450-510 |
| Product Reaction Temp. (°F.) at the exit of the Rototherm | 710 | 690-730 |
| Vapor Sep. Temp. (°F.) at point 34 on flow chart | 220 | 210-230 |
| Vacuum (in. H$_2$O) at point 26 on flow chart | 8" | 7.9-8.1" |
| Heat Temp. (°F.) measured at the inside surface of reactor 22 of the inside cavity of wall reactor | 620-640 | 610-670 |

The foregoing conditions represent those which may be practiced in treating vegetable oils such as soy, corn, sunflower, safflower, coconut, palm, palm kernel or the like as well as beef fat, kosher beef, chicken, pork or turkey.

The products produced by this process can be used as a liquid as such and can be sprayed or otherwise applied, all of which is within the skill of a person of ordinary skill in the art. On the other hand, the product itself may be spray-dried or otherwise reduced to a free-flowing powder, all of which similarly will occur to those skilled in the art. The product aromas will generally have an improved charcoal type overall flavor, as indicated previously relative to that of DiCicca et al. and Schulman et al.

While the invention has been described in connection wit the preferred embodiments, it should be recognized that changes and modifications may be made without departing from the scope of the appended claims.

What is claimed is:

1. A process for preparing a flavoring composition comprising the steps of:

providing a fat or oil which is suitable for producing an intense grill flavor when subjected to heat in the presence of oxygen;

forming a thin film of the fat or oil and subjecting the thin film of the fat or oil to an elevated temperature of at least about 600° F. in the presence of oxygen in a thin film heat exchanger causing the fat or oil to undergo a phase change to produce an exothermic gaseous material;

cooling the gaseous material to a temperature of between about 210° F. to about 230° F. in about 75 seconds to produce an oil phase and a vapor phase containing an aerosol;

separating the oil phase and the vapor phase and recovering the oil phase as a liquid flavor composition and separating the aerosol from the vapor phase by collecting the aerosol to thereby form a second flavor composition; and exhausting the gas or smoke.

2. A process for preparing a flavoring composition according to claim 1 which includes the step of providing a high speed swept surface agitator and subjecting the thin film of fat or oil to the action of said high speed swept surface agitator.

3. A process for preparing a flavoring composition according to claim 2 which includes the step of subjecting the aerosol to a higher air flow to heat ratio than the oil phase.

4. A process for preparing a flavoring composition according to claim 3 wherein the gaseous material is cooled from about 650° F. to about 230° F. in a period of about 75 seconds.

5. A process for preparing a flavoring composition according to claim 4 wherein the aerosol is subjected to an air flow to heat ratio of at least 2.5:1.

6. An apparatus for preparing a flavoring composition comprising:

means including a thin film heat exchanger and a high speed swept surface agitator for subjecting a thin film of fat or oil to an elevated temperature of at least about 600° F. in the presence of oxygen to cause the fat or oil to undergo a phase change to produce an exothermic gaseous material which includes an aerosol;

means for rapidly cooling the gaseous material to a temperature of between about 210° F. to about 230° F. in about 75 seconds to produce an oil phase and a gas vapor phase containing an aerosol;

means for subjecting the aerosol to a higher air flow to heat ratio than the airflow to heat ratio which exists during cooling;

means for separating the oil phase from the gas vapor phase and for removing the oil phase as a first flavor composition;

means for trapping the aerosol from the gaseous vapor phase as a liquid flavorant; and means for exhausting any remaining gas.

7. An apparatus for preparing a flavoring composition according to claim 6 which includes an aerosol vapor condenser as the means for trapping the aerosol from the gaseous vapor.

8. An apparatus for preparing a flavoring composition according to claim 7 which includes means for subjecting the aerosol to an air flow to heat ratio in the range of about 2.5–3:1.

* * * * *